United States Patent

Mizutani et al.

(10) Patent No.: US 10,829,001 B2
(45) Date of Patent: Nov. 10, 2020

(54) POWER MANAGEMENT SYSTEM, SERVER AND VEHICLE

(71) Applicant: TOYOTA JIDOSHA KABUSHIKI KAISHA, Toyota (JP)

(72) Inventors: Atsushi Mizutani, Toyota (JP); Daiki Kaneichi, Nisshin (JP); Hirotaka Karube, Toyota (JP); Jun Kondo, Nisshin (JP); Kenichi Komuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/167,436

(22) Filed: Oct. 22, 2018

(65) Prior Publication Data

US 2019/0118665 A1   Apr. 25, 2019

(30) Foreign Application Priority Data

Oct. 25, 2017   (JP) .................. 2017-206311

(51) Int. Cl.
| | |
|---|---|
| B60L 55/00 | (2019.01) |
| B60L 53/65 | (2019.01) |
| B60L 53/66 | (2019.01) |
| B60L 53/68 | (2019.01) |
| B60L 53/67 | (2019.01) |

(52) U.S. Cl.
CPC .............. B60L 55/00 (2019.02); B60L 53/65 (2019.02); B60L 53/665 (2019.02); B60L 53/67 (2019.02); B60L 53/68 (2019.02)

(58) Field of Classification Search
CPC .......... B60L 55/00; B60L 53/67; B60L 53/68; B60L 53/665; B60L 53/65
USPC ........................................................... 701/22
See application file for complete search history.

(56) References Cited

U.S. PATENT DOCUMENTS

2010/0274656 A1* 10/2010 Genschel ............... B60L 53/64
                                                              705/14.27
2016/0339793 A1* 11/2016 Khoo ................. G06Q 10/1093

FOREIGN PATENT DOCUMENTS

JP         2017-073915 A      4/2017

* cited by examiner

*Primary Examiner* — Gertrude Arthur Jeanglaude
(74) *Attorney, Agent, or Firm* — Hunton Andrews Kurth LLP

(57) ABSTRACT

A power management system includes a plurality of power stations, a plurality of vehicles capable of exchanging power with any of the power stations, and a server configured to communicate with the plurality of vehicles and the plurality of power stations. When each power station receives power from the vehicle or supplies power to the vehicle, each power station associates a power amount received from the vehicle or a power amount supplied to the vehicle with a user ID of the vehicle, and transmits the power amount to the server. The server sets a value point based on the power amount received from the power station, and provides the value point to the user having the user ID associated with the power amount.

14 Claims, 18 Drawing Sheets

FIG.7

VALUE POINTS

| ID | CURRENT USE CLASSIFICATION | CURRENT POWER AMOUNT | CURRENT POWER AMOUNT POINTS | CURRENT ADDED POINTS | CURRENT VALUE POINTS | CUMULATIVE VALUE POINTS |
|---|---|---|---|---|---|---|
| 001 | BATTERY COLLECTION (DISCHARGING) | ×××(Ah) | +100 POINTS | XXX POINTS | XXX POINTS | XXX POINTS |
| 002 | BATTERY REPLACEMENT (CHARGING) | ×××(Ah) | −20 POINTS | XXX POINTS | XXX POINTS | XXX POINTS |
| 003 | BATTERY SUPPLY (CHARGING) | ×××(Ah) | −80 POINTS | XXX POINTS | XXX POINTS | XXX POINTS |
| ... | ... | ... | ... | ... | ... | |

FIG.10

ADDED POINTS

| ID | VEHICLE LOCATION | ADDED POINTS | | |
|---|---|---|---|---|
| | | POWER STATION A | POWER STATION B | POWER STATION C |
| 001 | P1 | +100 POINTS | +10 POINTS | −10 POINTS |
| 002 | P2 | −10 POINTS | +100 POINTS | +10 POINTS |
| 003 | P3 | +10 POINTS | −10 POINTS | +100 POINTS |
| ... | ... | ... | ... | ... |

FIG.11

ADDED POINTS

| ID | USE CLASSIFICATION | PRE-REPLACEMENT SOC | ADDED POINTS | | |
|---|---|---|---|---|---|
| | | | POWER STATION A | POWER STATION B | POWER STATION C |
| 001 | BATTERY COLLECTION (DISCHARGING) | — | — | — | — |
| | BATTERY REPLACEMENT (CHARGING) | HIGH | -100 POINTS | -100 POINTS | -100 POINTS |
| | | MIDDLE | 0 POINT | 0 POINT | 0 POINT |
| | | LOW | +500 POINTS | +500 POINTS | +500 POINTS |
| | BATTERY SUPPLY (CHARGING) | — | — | — | — |
| ... | ... | | ... | ... | ... |

FIG.12

| ID | USE CLASSIFICATION | ADDED POINTS | | |
|---|---|---|---|---|
| | | POWER STATION A (DISCHARGE) | POWER STATION B | POWER STATION C (CHARGE) |
| 001 | BATTERY COLLECTION (DISCHARGING) | +500 POINTS | — | — |
| | BATTERY REPLACEMENT (CHARGING) | — | — | +500 POINTS |
| | BATTERY SUPPLY (CHARGING) | +500 POINTS | — | — |
| 002 | BATTERY COLLECTION (DISCHARGING) | — | — | — |
| | BATTERY REPLACEMENT (CHARGING) | — | — | +500 POINTS |
| | BATTERY SUPPLY (CHARGING) | — | — | — |
| ... | ... | ... | ... | ... |

POWER TRANSPORT: DISCHARGE → CHARGE

FIG.13

| ADDED POINTS | | | | | |
|---|---|---|---|---|---|
| | | | ENCOURAGE BATTERY COLLECTION | ADDED POINTS | SUPPRESS BATTERY COLLECTION |
| ID | USE CLASSIFICATION | | POWER STATION A (POWER SHORTAGE AREA) | POWER STATION B | POWER STATION C (POWER SURPLUS AREA) |
| 001 | BATTERY COLLECTION (DISCHARGING) | | +1000 POINTS | +100 POINTS | 0 POINT |
| | BATTERY REPLACEMENT (CHARGING) | | - | - | - |
| | BATTERY SUPPLY (CHARGING) | | - | - | - |
| ... | ... | | ... | ... | ... |

FIG.14

| ADDED POINTS | | SUPPRESS BATTERY COLLECTION / ENCOURAGE BATTERY SUPPLY | ENCOURAGE BATTERY COLLECTION / SUPPRESS BATTERY SUPPLY | |
|---|---|---|---|---|
| ID | USE CLASSIFICATION | POWER STATION A (SHORT ON STORAGE SPACE) | POWER STATION B | POWER STATION C (EXTRA STORAGE SPACE) |
| 001 | BATTERY COLLECTION (DISCHARGING) | −500 POINTS | − | +500 POINTS |
| | BATTERY REPLACEMENT (CHARGING) | − | − | − |
| | BATTERY SUPPLY (CHARGING) | +500 POINTS | − | −500 POINTS |
| ... | ... | ... | ... | ... |

FIG.16

CURRENT DISCHARGE LOCATION  : POWER STATION A
CURRENT DISCHARGE AMOUNT    : × × × (Ah)
CURRENT VALUE POINTS        : ○○○ POINTS

ARE THE ABOVE CONDITIONS ACCEPTABLE?

POWER MANAGEMENT SYSTEM, SERVER AND VEHICLE

This nonprovisional application is based on Japanese Patent Application No. 2017-206311 filed on Oct. 25, 2017 with the Japan Patent Office, the entire contents of which are hereby incorporated by reference.

BACKGROUND

Field

The present disclosure relates to a system for managing electric power exchanged between a vehicle and a power station, a server, and a vehicle for use in the system.

Description of the Background Art

Japanese Patent Laying-Open No. 2017-73915 discloses an electrically powered vehicle capable of supplying electric power to the outside of the vehicle. When this electrically powered vehicle is present in a designated disaster area, the lower limit of a SOC (State of Charge) of a vehicle-mounted power storage device is lowered. This allows the electrically powered vehicle to supply more power to the outside of the vehicle in the disaster area.

SUMMARY

As electrically powered vehicles become more prevalent in the future, it is expected that there will be an increasing need to use power stored in each electrically powered vehicle at another time or another location in order to more effectively use the power stored in each electrically powered vehicle.

The present disclosure was made to solve the above-described problem, and has an object to facilitate the use of power stored in a vehicle at another time or another location.

(1) A power management system according to the present disclosure includes a vehicle configured to supply power to a discharging installation and receive power from a charging installation, a plurality of power installations each having at least one of the discharging installation and the charging installation installed therein, and a server configured to communicate with the vehicle and the plurality of power installations. When each of the power installations receives power from the vehicle or supplies power to the vehicle, each of the power installations is configured to associate a power amount received from the vehicle or a power amount supplied to the vehicle with identification information of a user of the vehicle, and transmit the power amount to the server. The server is configured to set a value index based on the power amount received from the power installation, and provide the value index to the user having the identification information associated with the power amount.

Generally, when a vehicle supplies power (discharges) and receives power (charged) using a power installation, power conversion loss may occur in the vehicle or the power installation. Thus, if a user of a vehicle that performed discharging to a power installation is allowed to perform charging at another time or another power installation for the same power amount as the amount of power discharged from that vehicle, loss corresponding to the power conversion loss may occur for a company that runs the power installations.

In view of this fact, in the above-described system, a power amount used (discharged or charged) by the vehicle at the power installation is first converted into the value index by the server, and the value index is provided to the user of the vehicle. Flexible operation is thereby enabled based on power value during the use, and power conversion loss in the vehicle or the power installation, as compared to an example where the power amount used by the vehicle at the power installation is managed without being converted into the value index. As a result, the use of the power stored in the electrically powered vehicle at another time or another location can be facilitated.

(2) In one embodiment, when a user who performed power supply to a first power installation performs power reception from a second power installation at a location different from that of the first power installation, the server is configured to decrease the value index provided to the user.

According to the above-described configuration, the user of the vehicle can use the value index provided for having performed discharging at the first power installation to perform charging at another geographically distant second power installation.

(3) In one embodiment, the server is configured to separately set, for each of the plurality of power installations, a value of the value index provided for using the power installation.

According to the above-described configuration, the value of the value index provided for using each power installation can be adjusted separately for each power installation. Thus, by adjusting the value index for a particular power installation to a high value, for example, the user can be encouraged to use that power installation. Alternatively, by adjusting the value index for a particular power installation to a low value, the user can be discouraged from using that power installation.

(4) In one embodiment, the vehicle includes a power storage device detachable from the vehicle. The power installation is configured to receive power from the vehicle by device collection where the power storage device is collected from the vehicle. The power installation is configured to supply power to the vehicle by device replacement where the power storage device collected from the vehicle is replaced with a charged power storage device, or by device supply where the charged power storage device is supplied to the vehicle.

According to the above-described configuration, the power installation can exchange power with the vehicle by one of modes of the device collection where the power storage device is collected, the device replacement where the power storage device is replaced, and the device supply where the power storage device is supplied.

(5) In one embodiment, the server is configured to set the value index to a higher value when a state of charge of the power storage device collected at the power installation by the device collection or the device replacement is lower.

According to the above-described configuration, a higher value index is provided when the state of charge of the power storage device collected at the power installation is lower. As a result, the user can be encouraged to use up as much power stored in the power storage device as possible before performing the device collection or the device replacement at the power installation. The collection frequency or replacement frequency of the power storage device can thus be kept at low level.

(6) In one embodiment, the server is configured to separately set, for each of the plurality of power installations, the value index for the device collection, the value index for the device replacement, and the value index for the device supply.

According to the above-described configuration, the value index for each of the actions of device collection, device replacement and device supply can be adjusted separately for each power installation. Thus, value can be generated for moving the power storage device between the power installations by the user.

For example, the value index for the device supply is set to a high value at one power installation, and the value index for the device collection is set to a high value at the other power installation. As a result, the user can receive the power storage device by the device supply at one power installation, and transport that power storage device to the other power installation to perform the device collection, to gain a high value index. As a result, the user of the vehicle can be encouraged to transport power from one power installation to the other power installation.

(7) In one embodiment, the server is configured to set the value index for the device collection, the value index for the device replacement, and the value index for the device supply, depending on a power supply-demand situation at a location where each of the power installations is installed.

According to the above-described configuration, the value index for each of the actions of device collection, device replacement and device supply can be adjusted depending on the power supply-demand situation of the location where each power installation is installed.

For example, by setting the value index for the device collection to a high value at a power installation in an area where power demand is high, the user of the vehicle can be encouraged to perform the device collection (discharging) at that power installation. As a result, the user of the vehicle can be encouraged to transport power to the area where power demand is high.

(8) In one embodiment, the server is configured to set the value index for the device collection, the value index for the device replacement, and the value index for the device supply, depending on a number of the power storage devices that have been collected at each of the power installations.

According to the above-described configuration, the value index for each of the actions of device collection, device replacement and device supply can be adjusted depending on the number of power storage devices that have been collected at each power installation.

For example, by setting the value index for the device collection to a low value at a power installation having an excessive number of power storage devices collected, the user of the vehicle can be discouraged from performing the device collection at that power installation. As a result, uneven distribution of the power storage devices to a particular power installation can be suppressed.

(9) In one embodiment, the server is configured to associate the value index provided for using each of the power installations with location information of each of the power installations, and transmit the value index to the vehicle. The vehicle includes a navigation device to set any one of the locations of the power installations received from the server as a destination of the vehicle.

According to the above-described configuration, the user of the vehicle can easily set any of the power installations as a destination using the navigation device after checking the value index and the location information of each power installation received from the server.

(10) In one embodiment, the server is configured to transmit the value index provided for using each of the power installations to the vehicle. The vehicle includes a display configured to simultaneously display a power amount supplied to or received from the power installation, and the value index provided for using the power installation.

According to the above-described configuration, the user of the vehicle can determine whether or not it is beneficial to use a power installation after checking the value index corresponding to the power amount used (discharged or charged) at that power installation by looking at the display.

(11) In one embodiment, the server is configured to associate the value index provided for using each of the power installations with location information of each of the power installations, and transmit the value index to the vehicle. The vehicle includes a display configured to simultaneously display the location of the power installation, and a value of the value index provided for using the power installation on a map screen.

According to the above-described configuration, the user of the vehicle can determine which one of the power installations can be beneficially used after checking the locations of the power installations and the value indexes on the map.

(12) In one embodiment, the server is configured to transmit advertising information of a surrounding facility of each of the power installations to the vehicle. The display is configured to simultaneously display, in addition to the location of the power installation and the value of the value index, the advertising information of the surrounding facility of the power installation on the map screen.

According to the above-described configuration, in addition to the location of each power installation and the value index, the advertising information of the surrounding facility of the power installation is simultaneously displayed on the map screen. As a result, the user of the vehicle can be encouraged to use both the power installation and the surrounding facility of the power installation.

(13) A server according to the present disclosure is configured to communicate with a vehicle and a plurality of power installations. The vehicle is configured to supply power to a discharging installation and receive power from a charging installation. Each of the power installations includes at least one of the discharging installation and the charging installation. When receiving power from the vehicle or supplying power to the vehicle, each of the power installations is configured to associate a power amount received from the vehicle or a power amount supplied to the vehicle with identification information of a user of the vehicle, and transmit the power amount to the server. The server includes a communication device configured to communicate with the plurality of power installations, and a controller connected to the communication device. The controller is configured to set a value index based on the power amount received from the power installation, and provide the value index to the user having the identification information associated with the power amount.

The above-described server first converts the power amount used (discharged or charged) by the vehicle at the power installation into the value index, and provides the value index to the user of the vehicle. Flexible operation is thereby enabled based on power value during the use, and power conversion loss in the vehicle or the power installation, as compared to an example where the power amount used by the vehicle at the power installation is managed without being converted into the value index. As a result, the use of the power stored in the electrically powered vehicle at another time or another location can be facilitated.

(14) A vehicle according to the present disclosure is a vehicle configured to supply power to a discharging installation and receive power from a charging installation, and includes a communication device configured to communicate with a server and a plurality of power installations, a display, and a controller configured to control the display. Each of the power installations includes at least one of the discharging installation and the charging installation. When receiving power from the vehicle or supplying power to the vehicle, each of the power installations is configured to associate a power amount received from the vehicle or a power amount supplied to the vehicle with identification information of a user of the vehicle, and transmit the power amount to the server. The server is configured to convert the power amount received from the power installation into a value index, and provide the value index to the user having the identification information associated with the power amount. The controller is configured to cause the display to simultaneously display a power amount supplied to or received from the power installation, and the value index provided for using the power installation.

According to the above-described vehicle, the power amount supplied to or received from the power installation and the value index provided for using the power installation are simultaneously displayed on the display. As a result, the user of the vehicle can determine whether or not it is beneficial to use a power installation after checking the value index corresponding to the power amount used (discharged or charged) at that power installation by looking at the display.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 summarizes an example of information used when the server sets value points.

FIG. 10 is a diagram (No. 1) showing exemplary added points.

FIG. 11 is a diagram (No. 2) showing exemplary added points.

FIG. 12 is a diagram (No. 3) showing exemplary added points.

FIG. 13 is a diagram (No. 4) showing exemplary added points.

FIG. 14 is a diagram (No. 5) showing exemplary added points.

FIG. 16 is a diagram (No. 1) showing an exemplary screen displayed on a display.

DESCRIPTION OF THE PREFERRED EMBODIMENTS

Figure 1:
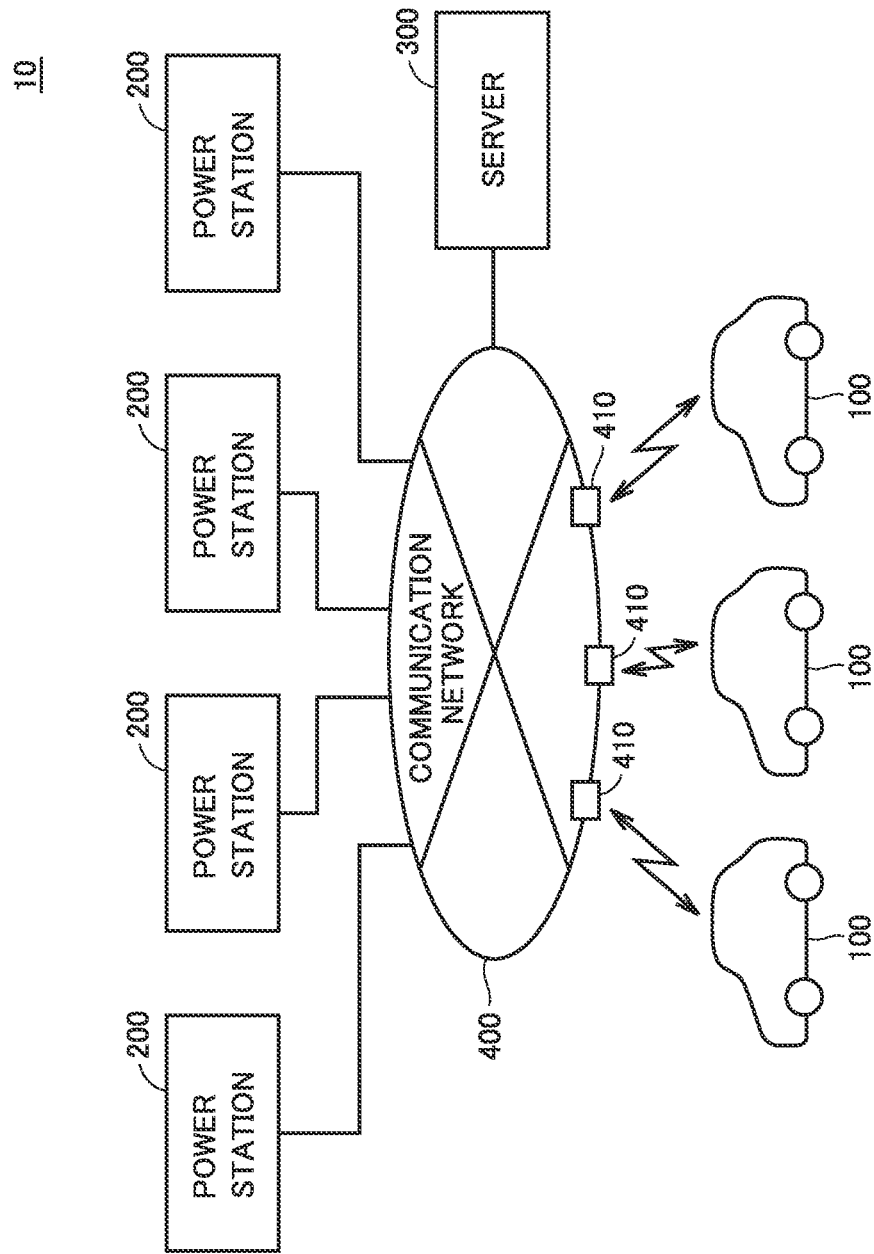
FIG. 1 schematically shows an overall configuration of a power management system.

Embodiments of the present disclosure will be described hereinafter in detail with reference to the drawings. It should be noted that the same or corresponding parts are designated by the same symbols in the drawings and will not be described repeatedly.

System Configuration

FIG. 1 schematically shows an overall configuration of a power management system 10 according to the present embodiment. Power management system 10 includes a plurality of electrically powered vehicles (hereinafter also referred to simply as "vehicles") 100, a plurality of power stations 200, and a server 300. Vehicles 100, power stations 200 and server 300 are configured to communicate with one another via a communication network 400 such as the Internet or a telephone network. It should be noted that each vehicle 100 is configured to send and receive information to and from a base station 410 of communication network 400 through wireless communication.

As will be described later with reference to FIG. 2, vehicle 100 is an electric vehicle (EV) capable of generating driving power for traveling using electric power from a power storage device mounted thereon, and permitting charging of the power storage device using electric power supplied from a power supply external to the vehicle.

Server 300 communicates with vehicle 100 and power station 200, and provides vehicle 100 and power station 200 with various information.

Figure 2:
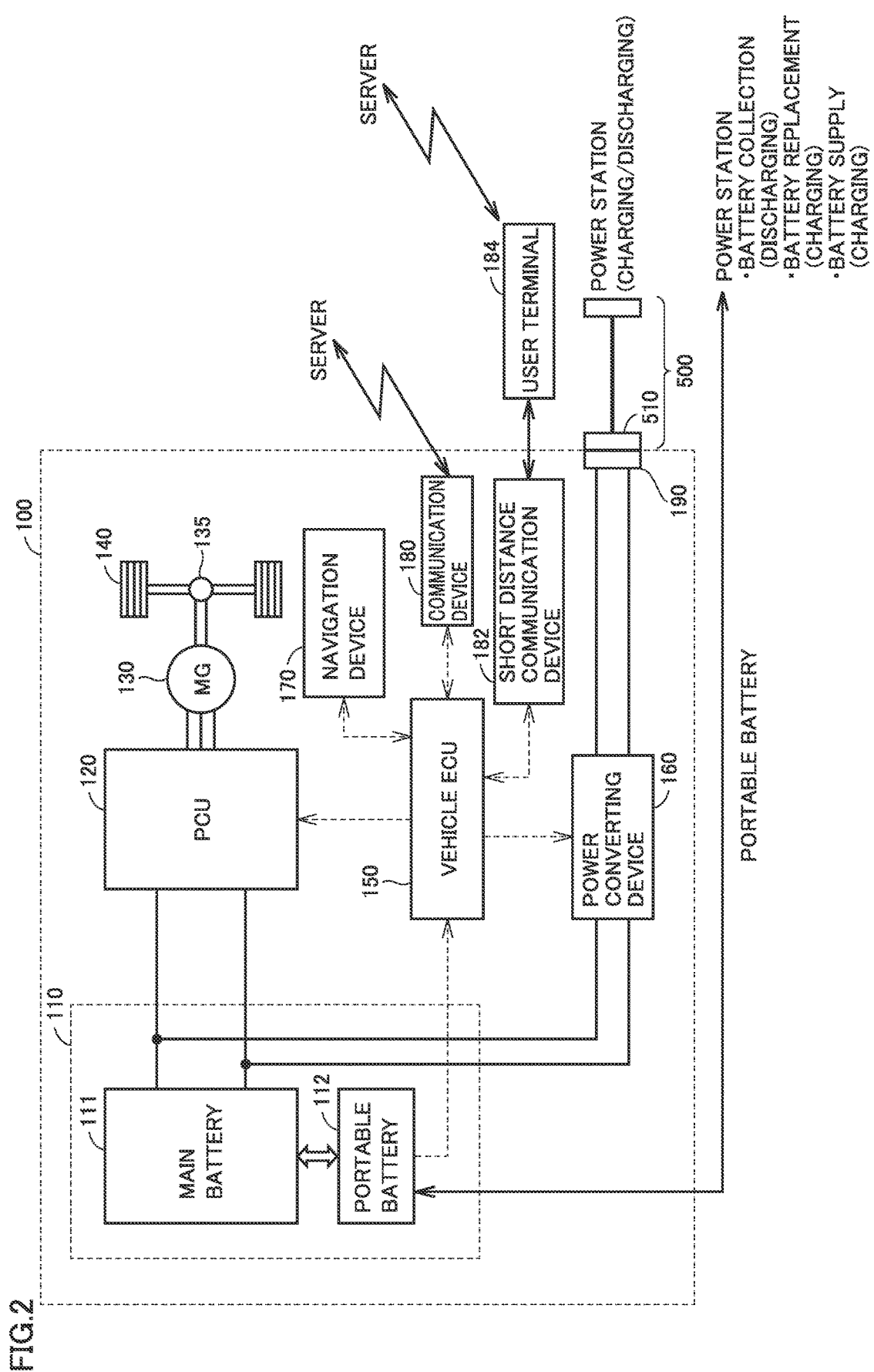
FIG. 2 shows an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using power supplied from a charging installation 250 (see FIG. 4 which will be described later) of power station 200. Moreover, in vehicle 100, the power of power storage device 110 can be discharged to a discharging installation 240 (see FIG. 4 which will be described later) of power station 200.

Power storage device 110 is configured to be charged and discharged. Power storage device 110 is configured to include a secondary battery such as a lithium ion battery or a nickel-metal hydride battery, for example. It should be noted that power storage device 110 may be configured to include a power storage element such as an electric double layer capacitor.

Power storage device 11 includes a main battery 111 and a portable battery 112. Portable battery 112 is detachable from main battery 111, and can be taken out of vehicle 100.

Power storage device 110 supplies electric power to PCU 120 so as to generate driving power of vehicle 100. Further, power storage device 110 stores electric power generated by motor generator 130.

PCU 120 is configured to include power converting devices such as a converter and an inverter, which are not shown in the figure. Each of the converter and the inverter is controlled by a control signal from vehicle ECU 150, to convert DC power from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 can generate electric power using rotation power of driving wheels 140 when vehicle 100 operates for regenerative braking. The electric power thus generated is converted by PCU 120 into charging power for power storage device 110.

Vehicle 100 further includes a communication device 180 and a short distance communication device 182. Communication device 180 is an interface for direct wireless communication with communication network 400. Communication device 180 can communicate with server 300 connected to communication network 400.

Short distance communication device 182 is an interface for making short distance wireless communication with a user terminal 184 (such as a smartphone) carried by the user of vehicle 100. It should be noted that user terminal 184 is configured to directly communicate with communication network 400. Therefore, short distance communication device 182 can communicate, via user terminal 184, with server 300 connected to communication network 400.

As a configuration for exchanging power with power station 200, vehicle 100 further includes a power converting device 160 and a connector 190. Connector 190 is configured to allow a charging connector 510 of a charging cable 500 to be connected thereto.

Power converting device 160 is connected between power storage device 110 and connecter 190. Power converting device 160 is controlled by a control signal from vehicle ECU 150. When charging power storage device 110 using power supplied from power station 200, power converting device 160 converts the power supplied from power station 200 into power with which power storage device 110 can be charged. When discharging power storage device 110 to power station 200, power converting device 160 converts the power of power storage device 110 into power that can be output to power station 200.

Vehicle 100 can perform the power exchange with power station 200 not only electrically using power converting device 160, but also be physically (mechanically) by carrying portable battery 112. Specifically, in vehicle 100, the power of power storage device 110 can be partially discharged to power station 200 by supplying portable battery 112 storing power to power station 200. Moreover, in vehicle 100, power storage device 110 can be charged with the power of power station 200 by replacing old used portable battery 112 with new charged portable battery 112 at power station 200, or by receiving a supply of new charged portable battery 112 and connecting it to main battery 111 at power station 200.

When viewed from the side of power station 200, power station 200 can receive power from vehicle 100 by "battery collection" where portable battery 112 is collected from vehicle 100. Power station 200 can also supply power to vehicle 100 by "battery replacement" where portable battery 112 collected from vehicle 100 is replaced with charged portable battery 112, or by "battery supply" where charged portable battery 112 is supplied to vehicle 100.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

Figure 3:
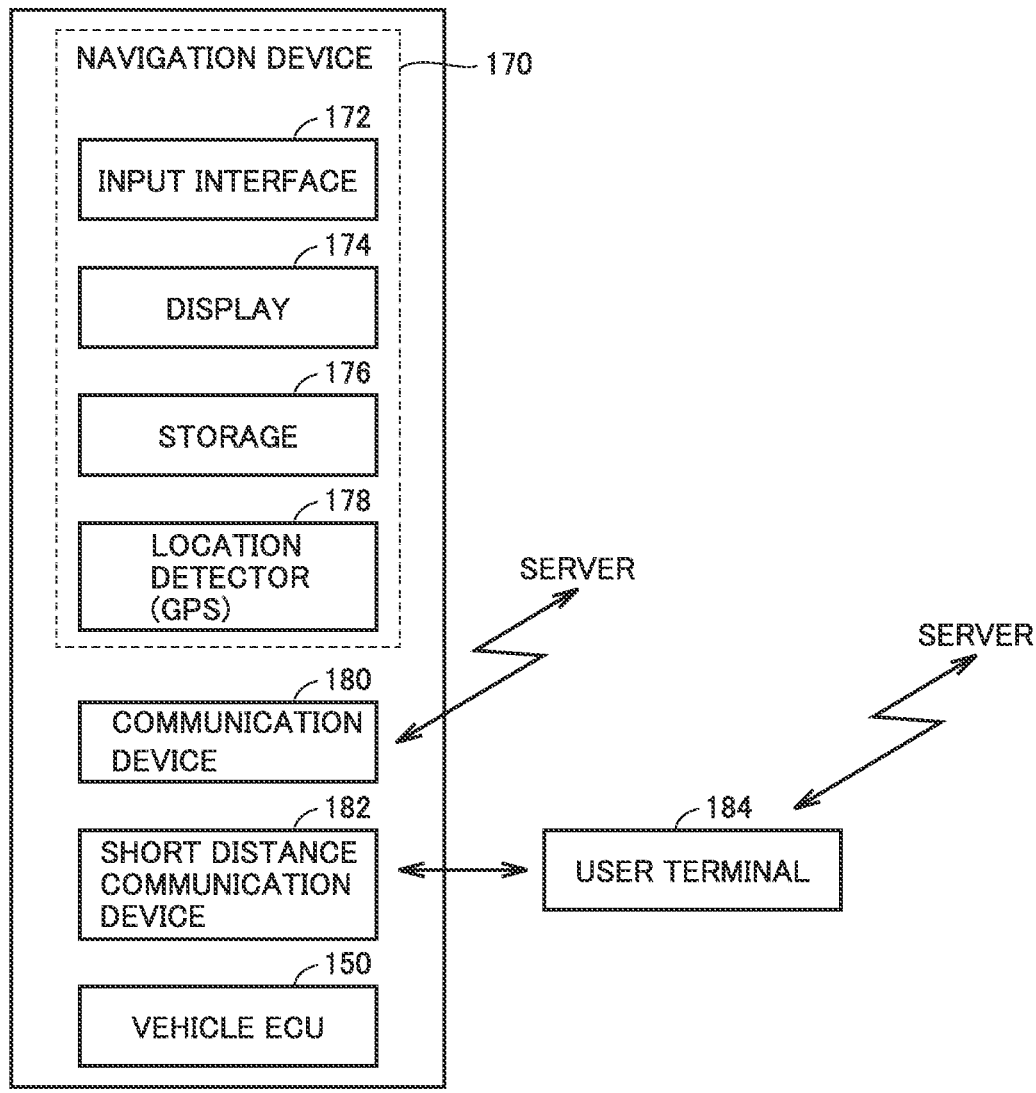
FIG. 3 is a block diagram showing a configuration related to a navigation device in the vehicle.

FIG. 3 is a block diagram showing a configuration related to navigation device 170 in vehicle 100. Navigation device 170 includes an input interface 172, a display 174, a storage 176, and a location detector 178 as shown in FIG. 3. Navigation device 170 uses map information stored in storage 176 and location information (GPS information) of vehicle 100 detected by the GPS (Global Positioning System) of location detector 178, so as to display the current location of vehicle 100 on a map to the user and provide navigation to a destination.

Display 174 is constructed of a liquid crystal panel, for example, and displays the current location of vehicle 100 or various information from vehicle ECU 150. Input interface 172 is constructed of a touch panel, a switch or the like, and receives operation by the user.

Figure 4:
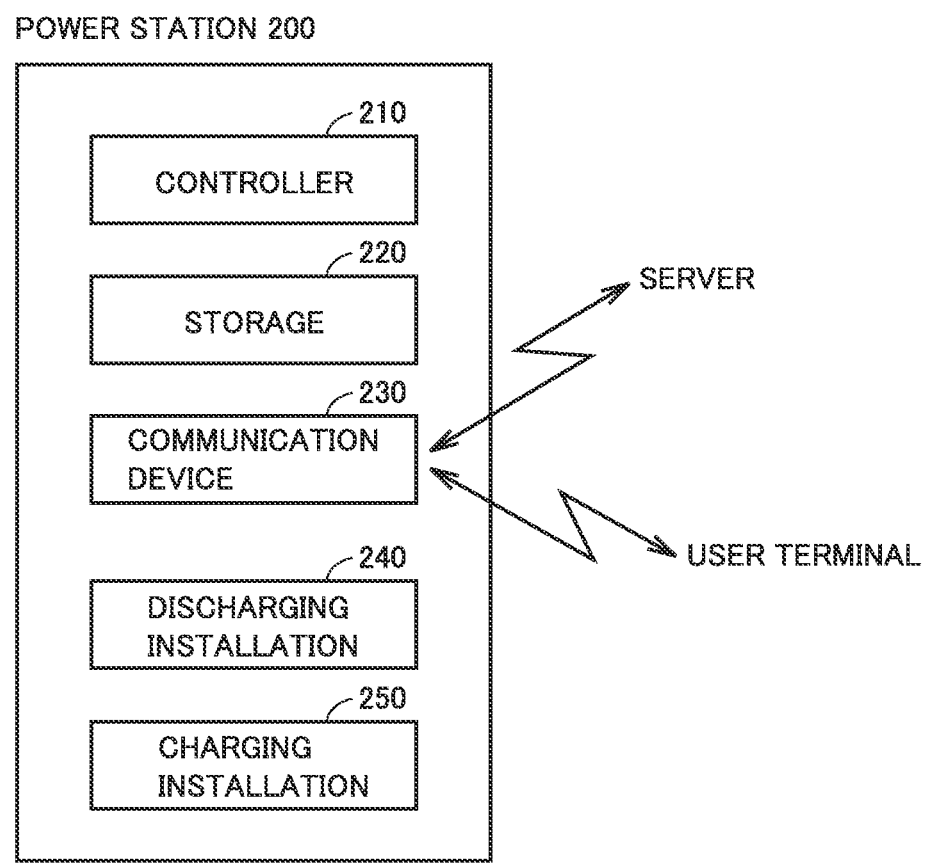
FIG. 4 is a block diagram showing a configuration of a power station.

FIG. 4 is a block diagram showing a configuration of power station 200. Power station 200 includes a controller 210, a storage 220, a communication device 230, discharging installation 240, and charging installation 250.

Communication device 230 is an interface for making communication with vehicle 100 or user terminal 184 via communication network 400. Storage 220 stores the map information, the information received from vehicle 100, and the like.

Discharging installation 240 is a facility for vehicle 100 to be discharged. Specifically, discharging installation 240 is a facility for receiving power discharged from vehicle 100 and returning the power a commercial power grid, or for collecting portable battery 112 by the above-described "battery collection."

Charging installation 250 is a facility for vehicle 100 to be charged. Specifically, charging installation 250 is a facility for supplying power from a commercial power grid to vehicle 100, or for charging portable battery 112 for performing the above-described "battery replacement" or "battery supply."

Although each of the plurality of power stations 200 according to the present embodiment includes both discharging installation 240 and charging installation 250, some of the plurality of power stations 200 may each include discharging installation 240 and not include charging installation 250, and the others may each include charging installation 250 and not include discharging installation 240.

Figure 5:
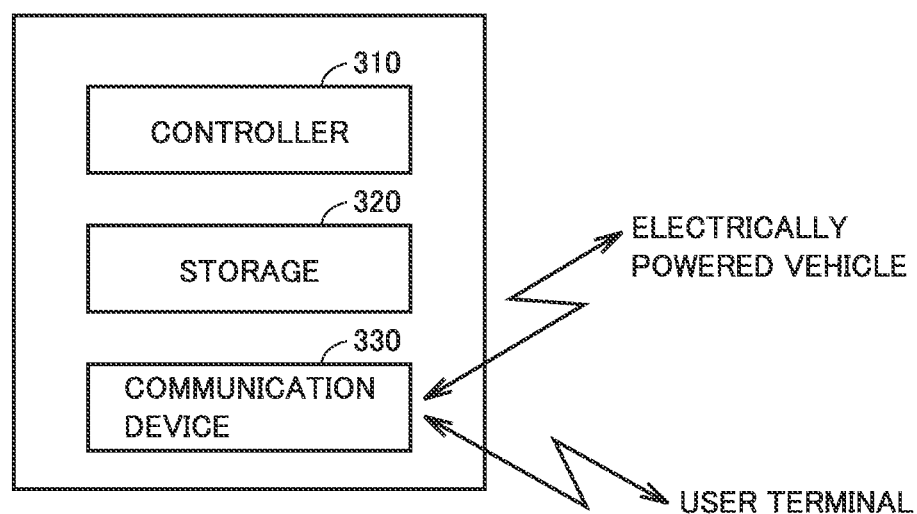
FIG. 5 is a block diagram showing a configuration of a server.

FIG. 5 is a block diagram showing a configuration of server 300. Server 300 includes a controller 310, a storage 320, and a communication device 330.

Communication device 330 is an interface for making communication with vehicle 100 or user terminal 184 via communication network 400. Storage 320 stores the map information, the information received from vehicle 100, and the like.

Controller 310 performs a process of providing "value points (value index)" which will be described later to the user of vehicle 100 based on the information received by communication device 330 from vehicle 100, the information stored in storage 320, and the like.

Provision of Value Points

As electric vehicles (EVs) such as vehicle 100 become more prevalent, it is expected that there will be an increasing need to use power stored in each vehicle 100 at another time or another location in order to more effectively use the power stored in each vehicle 100.

However, when vehicle 100 is discharged and charged using power station 200, power conversion loss may occur in vehicle 100 or power station 200. Thus, if the user of vehicle 100 that performed discharging to a power station is allowed to perform charging at another time or another geographically distant power station for the same power amount as the amount of power discharged from that vehicle 100, loss corresponding to the power conversion loss may occur for a company that runs the power stations.

In view of this fact, in power management system 10 according to the present embodiment, a power amount used (discharged or charged) by vehicle 100 at power station 200 is first converted into value points (value index) by server 300, and the value points are provided to the user of vehicle 100. Flexible operation is thereby enabled based on power value during the use, and power conversion loss in each vehicle 100 or each power station 200, as compared to an example where the power amount used by vehicle 100 is managed without being converted into the value points. As a result, a service allowing the user of vehicle 100 to use the power stored in vehicle 100 by himself/herself in the future or to lend the power to another person can be provided. The details of this service are described below.

Figure 6:
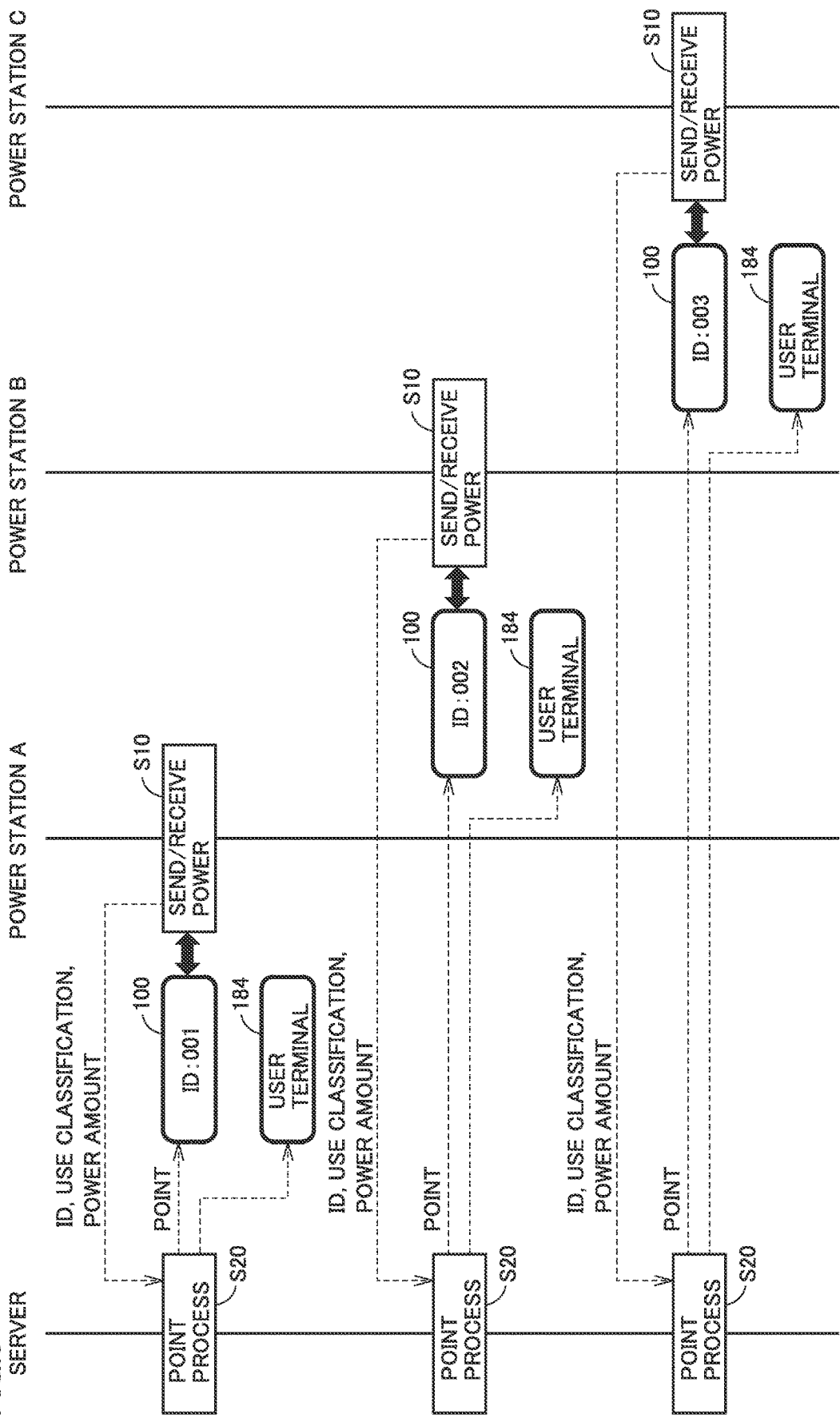
FIG. 6 is a sequence diagram (No. 1) showing an exemplary process performed among the vehicles, the power stations and the server.

FIG. 6 is a sequence diagram showing an exemplary process performed among vehicles 100 (more specifically, vehicle ECUs 150), power stations 200 (more specifically, controllers 210), and server 300 (more specifically, controller 310) included in power management system 10. In order to simplify the description, FIG. 6 shows an example where three vehicles 100 use three power stations 200 (power stations A to C), respectively.

In power management system 10 according to the present embodiment, identification information for identifying vehicle 100 (hereinafter also referred to as "vehicle ID") is provided to each vehicle 100. FIG. 6 shows an example where the vehicle IDs of three vehicles 100 are set to "001," "002" and "003," respectively. In addition, identification information for identifying a user of vehicle 100 (hereinafter also referred to as "user ID") is provided to the user.

In the present embodiment, each user ID is set to the same value as that of a vehicle ID of vehicle 100 owned by the user. Thus, the vehicle ID and the user ID are also interchangeably referred to simply as "ID" in the following. The following mainly describes the case where each vehicle 100 performs power exchange with power station 200 physically (mechanically) by carrying portable battery 112.

When power station A sends and receives power to and from the vehicle with ID "001," power station A transmits use information of that vehicle to server 300 (step S10). Specifically, power station A receives the ID "001" from the vehicle or user terminal 184 owned by a user of the vehicle, and associates information indicating which one of the battery collection (discharging), battery replacement (charging) and battery supply (charging) has been used by the vehicle (hereinafter also referred to as "use classification"), and the discharged or charged power amount of the vehicle with the ID "001," and transmits the information and the power amount to server 300.

When each power station exchanges portable battery 112 with each vehicle, each power station may know the discharged or charged power amount of the vehicle by reading the amount of power stored in portable battery 112 which is stored in a memory mounted on portable battery 112, for example.

When server 300 receives the use information (the vehicle ID, the use classification, the power amount) from power station A, server 300 performs a "point process" of setting "value points" based on the received use information, and providing the value points to a user having the ID "001" included in the use information (step S20). Server 300 transmits the value points provided by the point process to the vehicle and the user with ID "001."

When the vehicle with ID "002" uses power station B, and when the vehicle with ID "003" uses power station C, a process similar to that when the vehicle with ID "001" uses power station A is performed.

FIG. 7 summarizes an example of information used when server 300 sets the value points in the point process (step S20 in FIG. 6).

When server 300 receives the use information (the ID, the use classification, the power amount) from a power station, server 300 calculates "current power amount points" and "current added points" using the received use information, and sets their sum as "current value points."

The "current power amount points" are a power amount used by the vehicle this time, which has been converted into points. In the example of FIG. 7, for the vehicle with ID "001," which has the "battery collection" as the use classification and is discharged to the power station, "+100 points" in accordance with a discharged power amount are set in exchange therefor as the current power amount points. In this manner, when the vehicle is discharged at the power station, "+(plus)" power amount points are provided in exchange therefor.

For the vehicle with ID "002," which has the "battery replacement" as the use classification and has been charged using the power of the power station, "−20 points" in accordance with a charged power amount are set in exchange therefor as the current power amount points. For the vehicle with ID "003," which has the "battery supply" as the use classification and is charged using the power of the power station, "−80 points" in accordance with a charged power amount are set in exchange therefor as the current power amount points. In this manner, when the vehicle is charged using the power of the power station, "−(minus)" power amount points are provided in exchange therefor.

The "added points," on the other hand, are points arbitrarily set by server 300, separately from the power amount used by the vehicle. By adjusting the added points by server 300, the value points provided to the user can be varied even when the vehicle used the same power amount. It should be noted that the added points are predetermined values in the present embodiment.

Server 300 sets the sum of the "current value points" and the prior cumulative value points as "cumulative value points." Then, server 300 transmits the point information set as described above to vehicle 100 having each ID and user terminal 184. The "cumulative value points" are stored with the ID in storage 320 of server 300, and used for calculation of the next value points.

The user, provided with the value points from server 300 for having performed discharging at power station 200, can use the value points to perform charging at power station 200 the same as or different from power station 200 where the discharging was performed.

Figure 8:
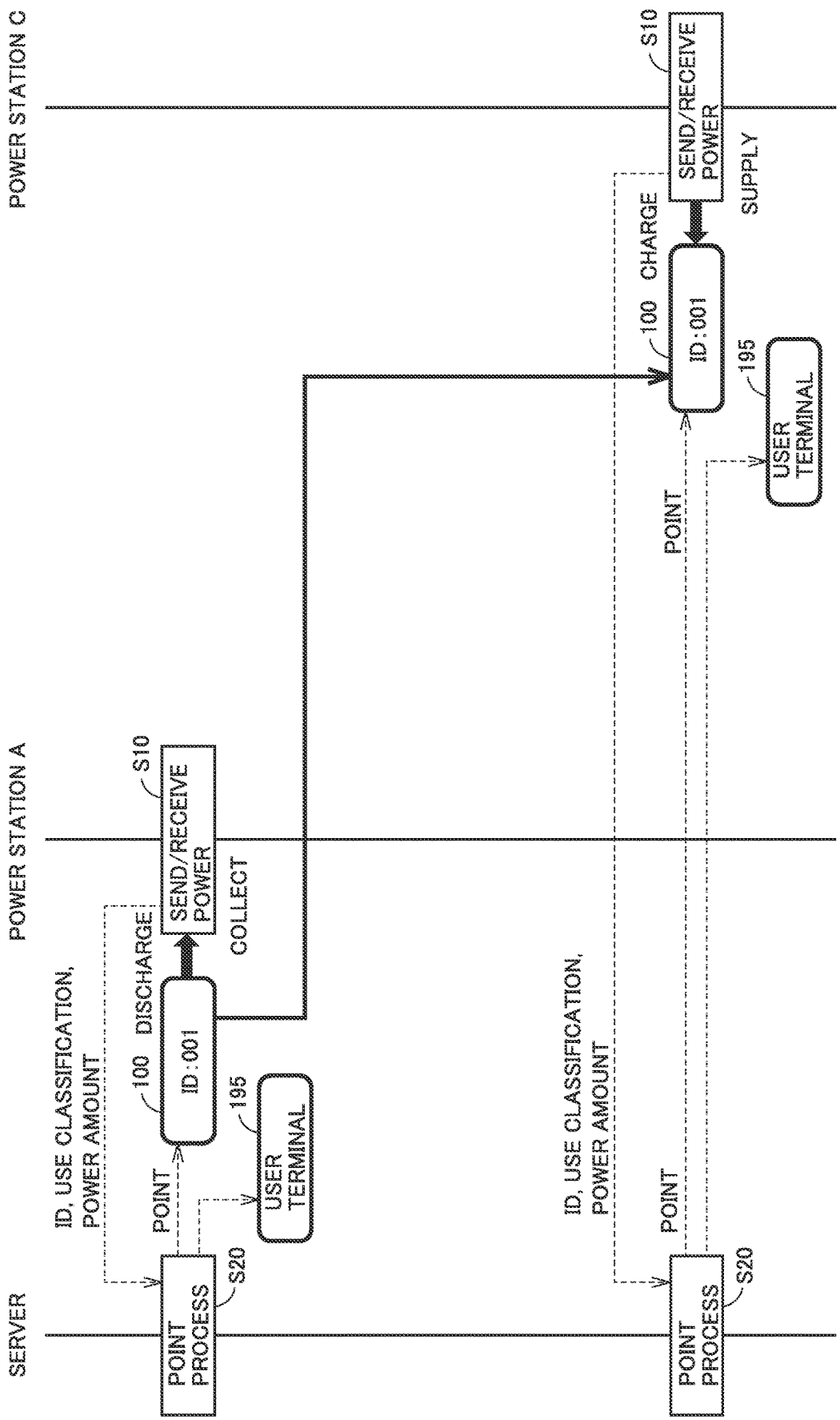
FIG. 8 is a sequence diagram (No. 2) showing an exemplary process performed among the vehicle, the power stations and the server.

FIG. 8 is a sequence diagram showing an exemplary process performed among vehicle 100, power stations A, B, and server 300 when vehicle 100 with ID "001" is discharged at power station A, and then charged at different power station C.

When power station A receives power discharged from the vehicle with ID "001" (collects portable battery 112), power station A transmits "ID: 001," "use classification: battery collection (discharging)" and "power amount" to server 300 as the use information of the vehicle (step S10). Server 300 sets plus value points based on the use information of "discharging" received from power station A, and provides the value points to the user with ID "001" (step S20). As a result, the cumulative value points owned by the user with ID "001" are increased.

Then, when the user with ID "001" performs charging by receiving a supply of portable battery 112 at power station C at a location different from that of power station A, power station C transmits "ID (001)," "use classification: battery supply (charging)" and "power amount" to server 300 as the use information of the vehicle (step S20). Server 300 sets minus value points based on the use information of "charging" received from power station C, and provides the value points to the user with ID "001" (step S20). As a result, the cumulative value points owned by the user with ID "001" are decreased.

That is, when the user who performed discharging at power station A performs charging at power station C at a location different from that of power station A, server 300 decreases the value points provided to the user. As a result, the user can use the value points, obtained in exchange for the discharging at power station A, to pay for the charging at another geographically distant power station C.

As described above, server 300 according to the present embodiment converts the power amount used by vehicle 100 at power station 200 into value points, and provides the value points to the user of vehicle 100. Flexible operation is thereby enabled based on power value during the use, and power conversion loss in each vehicle 100 or each power station 200, as compared to an example where the power amount used by vehicle 100 at power station 200 is managed without being converted into the value points. As a result, the use of the power stored in vehicle 100 at another time or another location can be facilitated.

Modification 1

In the embodiment described above, server 300 may set, separately for each vehicle 100 and each power station 200, the value of the "added points" used for calculating the value points in the point process (step S20 of FIG. 6).

Figure 9:
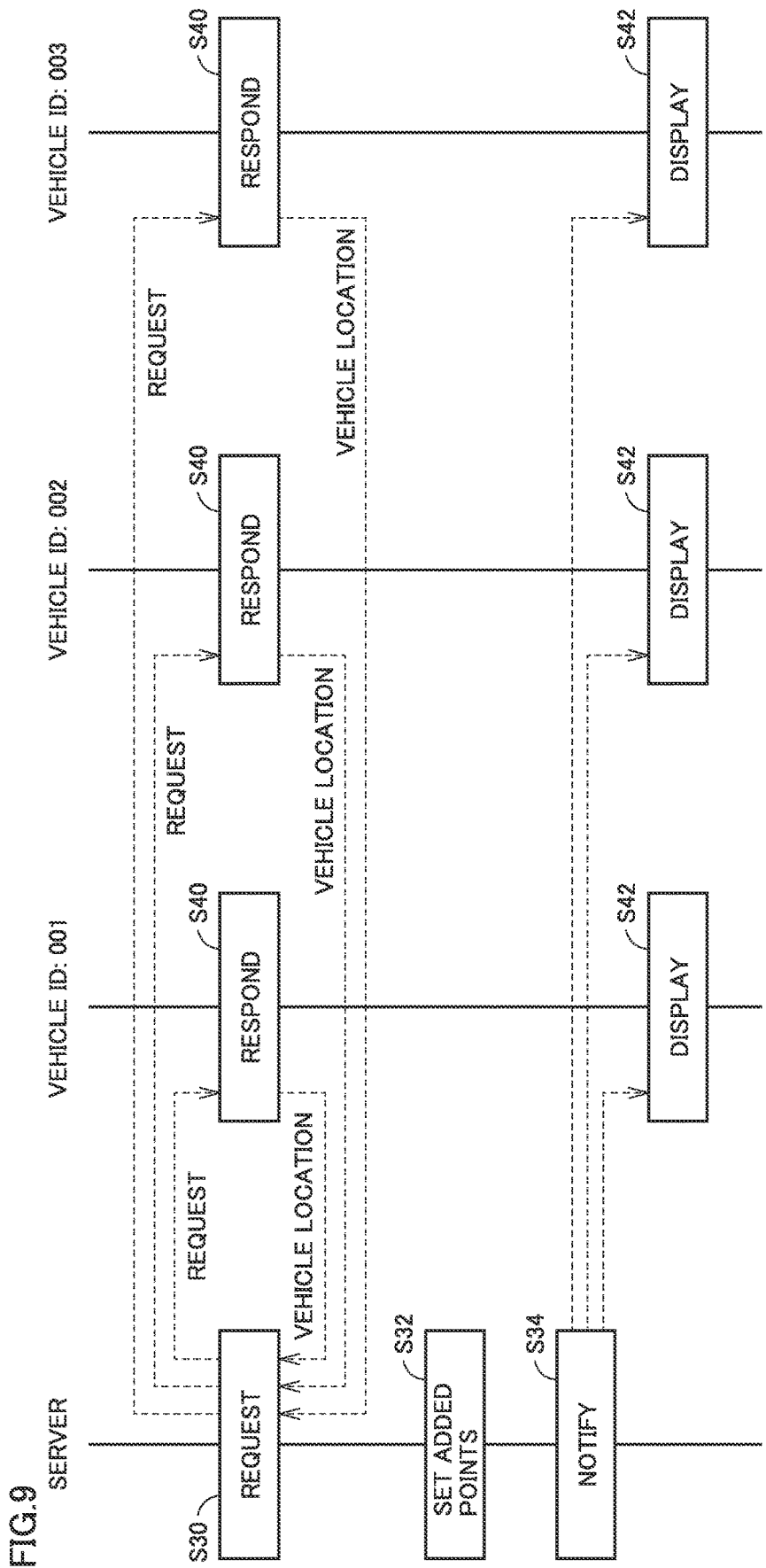
FIG. 9 is a sequence diagram (No. 1) showing an exemplary process performed between the vehicles and the server.

FIG. 9 is a sequence diagram showing an exemplary process performed between vehicles 100 and server 300 according to modification 1. In order to simplify the description, FIG. 9 shows an example where three vehicles 100 with IDs "001," "002" and "003," respectively, are communicating with server 300.

Server 300 requests each vehicle 100 to transmit location information of each vehicle (step S30). In response to the request from server 300, each vehicle 100 transmits the location information (GPS information) of its own vehicle to server 300 (step S40).

When server 300 receives the location information of each vehicle, server 300 performs an "added point setting process" of setting a value of added points for using each power station 200 by each vehicle 100 based on the received location information of each vehicle, and the location information of each power station 200 stored in advance in storage 320 (step S32).

FIG. 10 shows exemplary added points set by the added point setting process (step S32 of FIG. 9). As shown in FIG. 10, the added points are set separately for each vehicle 100 and each power station 200.

In the example shown in FIG. 10, for the vehicle with ID "001," the added points for using power stations A, B and C are set to "+100 points," "+10 points" and "−10 points," respectively, in consideration of the positional relationship between the vehicle and each power station. With such setting, the user of the vehicle with ID "001" can gain higher value points for using power station A than for using other power stations B and C, even when the same amount of power is discharged.

For the vehicle with ID "002," the added points for using power stations A, B and C are set to "−10 points," "+100 points" and "+10 points," respectively, in consideration of the positional relationship between the vehicle and each power station. With such setting, the user of the vehicle with ID "002" can gain higher value points for using power station B than for using other power stations A and C, even when the same amount of power is discharged.

For the vehicle with ID "003," the added points for using power stations A, B and C are set to "+10 points," "−10 points" and "+100 points," respectively, in consideration of the positional relationship between the vehicle and each power station. With such setting, the user of the vehicle with ID "003" can gain higher value points for using power station C than for using other power stations A and B, even when the same amount of power is discharged.

Returning to FIG. 9, server 300 notifies each vehicle 100 of the added points set by the added point setting process, together with the location information of each power station 200 (step S34). Each vehicle 100 performs a "display process" of displaying the information received from server 300 (the location of each power station, the added points and the like) on display 174 (step S42). As a result, the user of each vehicle 100 can determine which one of the power stations should be used to gain higher value points by looking at the information displayed on display 174, and use that power station.

As described above, in modification 1, the value of the value points (added points) provided for using each power station 200 by each vehicle 100 can be adjusted for each vehicle 100 and each power station 200. Thus, by adjusting the value index for a particular power station to a high value with respect to a particular vehicle, for example, a user of the particular vehicle can be encouraged to use the particular power station. Alternatively, by adjusting the value index for a particular power station to a low value with respect to a particular vehicle, for example, a user of the particular vehicle can be discouraged from using the particular power station. With such adjustment, the power station used by each vehicle can be controlled, to suppress the concentration of use on a particular power station, for example.

Modification 2

In the added point setting process (step S32 of FIG. 9) described above, server 300 may set the added points to a higher value when the state of charge of portable battery 112 collected at power station 200 by the battery replacement is lower.

FIG. 11 shows exemplary added points set in modification 2. In FIG. 11, the added points when the state of charge of portable battery 112 collected at each power station 200 by the battery replacement (pre-replacement SOC) is "low," "middle" and "high" are set to "+500 points," "0 point" and "−100 points," respectively. With such setting, the user can be encouraged to use up as much power stored in portable battery 112 as possible before performing the battery replacement. The battery replacement frequency can thus be kept at low level.

Although not shown in FIG. 11, the value points (added points) may be set to a higher value when the state of charge of portable battery 112 collected at each power station 200 by the battery collection (pre-collection SOC) is lower. With such setting, the user can be encouraged to use up as much power stored in portable battery 112 as possible before performing the battery collection. The battery collection frequency can thus be kept at low level.

Modification 3

In the added point setting process (step S32 of FIG. 9) described above, server 300 may set, separately for each power station 200, the added points for the battery collection, the added points for the battery replacement, and the added points for the battery supply. By setting a separate value point for each of the actions of battery collection, battery replacement and battery supply in this manner, value can be generated for physically transporting portable battery 112 between the power stations, thereby reducing the total power transport cost.

FIG. 12 shows exemplary added points set in modification 3. In the example shown in FIG. 12, at power station A, the added points for the battery collection are set to "+500 points," and the added points are not provided to the other battery replacement and battery supply. At power station C, on the other hand, the added points for the battery supply are set to "+500 points," and the added points are not provided to the other battery collection and battery replacement.

With such setting, the user can perform the battery supply of receiving charged portable battery 112 at power station C, and transport that portable battery 112 to power station A and perform the battery collection, to gain "+500 points" for the battery supply at power station C and "+500 points" for the battery collection at power station A, which total as high as "+1000 points" as the value points. As a result, the user of the vehicle can be encouraged to transport power from power station C to power station A.

As described above, in modification 3, the value of added points for each of the actions of battery collection, battery replacement and battery supply can be adjusted separately for each power station. Thus, value can be generated for moving portable battery 112 between the power stations by the user, thereby reducing the total power transport cost.

Modification 4

In the added point setting process (step S32 of FIG. 9) described above, server 300 may set the added points for the battery collection, the added points for the battery replacement, and the added points for the battery supply, depending on the power supply-demand situation at a location where each power station 200 is installed.

FIG. 13 shows exemplary added points set by modification 4. In the example shown in FIG. 13, the installation location of power station A is a power shortage area where power supply is tight, and the installation location of power station C is a power surplus area where power supply is not tight.

In this case, at power station A located in the power shortage area, server 300 sets the added points for the battery collection to a relatively high value. As a result, the user of the vehicle can be encouraged to perform the battery collection (discharging) in the area where power demand is high.

At power station C located in the power surplus area, on the other hand, server 300 sets the added points for the battery collection to a relatively low value. As a result, the user of the vehicle can be discouraged from performing the battery collection (discharging) in the area where power demand is low.

As described above, in modification 5, the value of added points for each of the actions of battery collection, battery replacement and battery supply can be adjusted depending on the power supply-demand situation of the location where each power station 200 is installed. As a result, the user can be encouraged to transport power depending on the power supply-demand situation.

Modification 5

In the added point setting process (step S32 of FIG. 9) described above, server 300 may set the added points for the battery collection, the added points for the battery replacement, and the added points for the battery supply, depending on the number of portable batteries 112 that have been collected at each power station 200.

FIG. 14 shows exemplary added points set by modification 5. In the example shown in FIG. 14, power station A has collected a large number of portable batteries 112 and is short on space for storing portable batteries 112, and power station C has collected a small number of portable batteries 112 and has extra space for storing portable batteries 112.

In this case, at power station A which is short on storage space, server 300 sets the added points for the battery collection to a relatively low "−500 points," and sets the added points for the battery supply to a relatively high "+500 points." As a result, the user of the vehicle can be discouraged from performing the battery collection and encouraged to perform the battery supply at power station A.

At power station C which has extra storage space, on the other hand, server 300 sets the added points for the battery collection to a relatively high "+500 points," and sets the added points for the battery supply to a relatively low "−500 points." As a result, the user of the vehicle can be discouraged from performing the battery supply and encouraged to perform the battery collection at power station C.

As described above, in modification 5, the value of added points for each of the actions of battery collection, battery replacement and battery supply can be adjusted depending on the number of portable batteries 112 that have been collected at each power station 200 (storage space situation). Thus, uneven distribution of portable batteries 112 to a particular power station 200 can be suppressed.

Modification 6

In modification 1 described above, navigation device 170 of each vehicle 100 may be configured to set any one of the locations of the power stations received from server 300 as a destination.

Figure 15:
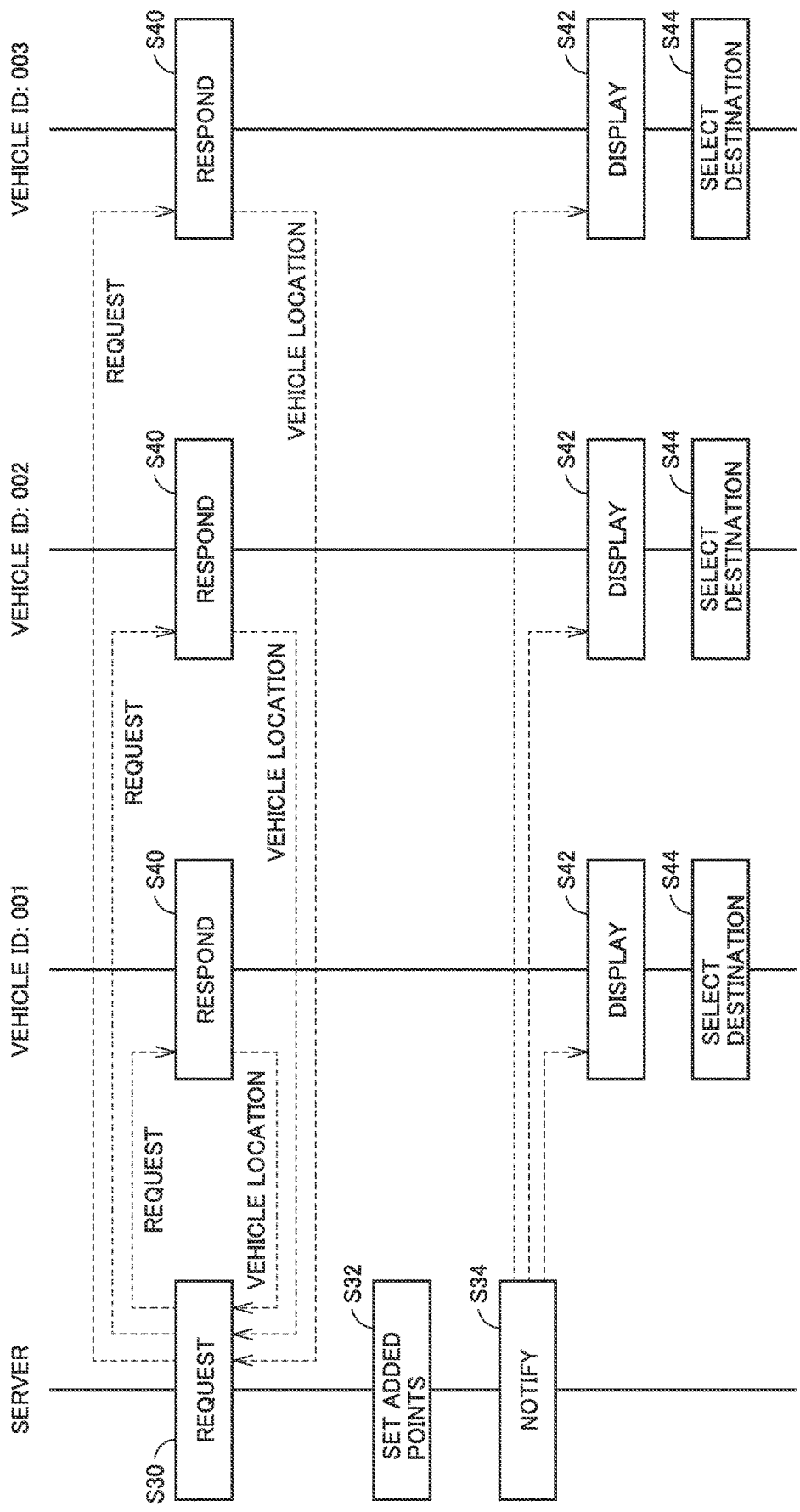
FIG. 15 is a sequence diagram (No. 2) showing an exemplary process performed between the vehicles and the server.

FIG. 15 is a sequence diagram showing an exemplary process performed between vehicles 100 and server 300 according to modification 6. In the sequence diagram shown in FIG. 15, a process of step S44 performed by each vehicle 100 has been added to FIG. 9 described above. The other steps (steps denoted by the same numbers as those of the steps in FIG. 9) have been already described and thus will not be described repeatedly here in detail.

When the information received from server 300 is displayed on display 174 in the display process (step S42), and the user performs operation of selecting one of the power stations displayed on display 174, each vehicle 100 sets the location of the power station selected by the user as a destination of vehicle 100, and provides navigation to the destination (step S44).

In this manner, the user of each vehicle 100 can easily set any of the power stations as a destination after checking the value points and the location information of each power station received from server 300.

It should be noted that the processes of steps S42 and S44 may be implemented by user terminal 184 which communicates with server 300 or each vehicle 100.

Modification 7

In the display process (step S42 of FIG. 9) described above, each vehicle 100 may simultaneously display the discharged or charged power amount of vehicle 100, and the value points provided for using each power station 200 on display 174.

FIG. 16 shows an exemplary screen displayed on display 174 in the display process (step S42 of FIG. 9) of modification 7. As shown in FIG. 16, the screen of display 174 simultaneously display messages of "current discharge location: power station A," "current discharge amount" and "current value points."

With such display, the user of the vehicle can determine whether or not it is beneficial to use a power station 200 after checking the value points corresponding to the power amount used (discharged or charged) at that power station 200 by looking at the screen of display 174.

Modification 8

In the display process (step S42 of FIG. 9) described above, each vehicle 100 may simultaneously display the locations of power stations 200, and the values of value points for using power stations 200 on a map screen of display 174.

Figure 17:
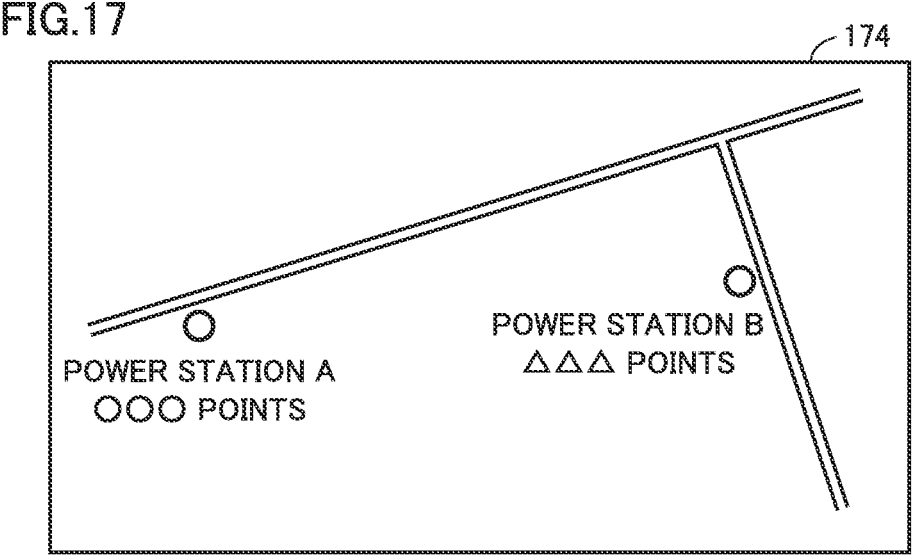
FIG. 17 is a diagram (No. 2) showing an exemplary screen displayed on the display.

FIG. 17 shows an exemplary screen displayed on display 174 according to modification 8. As shown in FIG. 17, the screen of display 174 simultaneously displays the location and the value points of power station A, and the location and the value points of power station B on a map.

With such display, the user of the vehicle can determine which one of power stations 200 can be beneficially used after checking the locations and the value points of power stations 200 on the map.

It should be noted that the location of its own vehicle may be further displayed on the map screen of display 174. As a result, the user of the vehicle is able to know the relative positional relationship between its own vehicle and each power station 200 on the map.

Modification 9

In the display process (step S42 of FIG. 9) described above, each vehicle 100 may simultaneously display, in addition to the locations and the value points of power stations 200, advertising information of surrounding facilities of power stations 200 on display 174.

Figure 18:
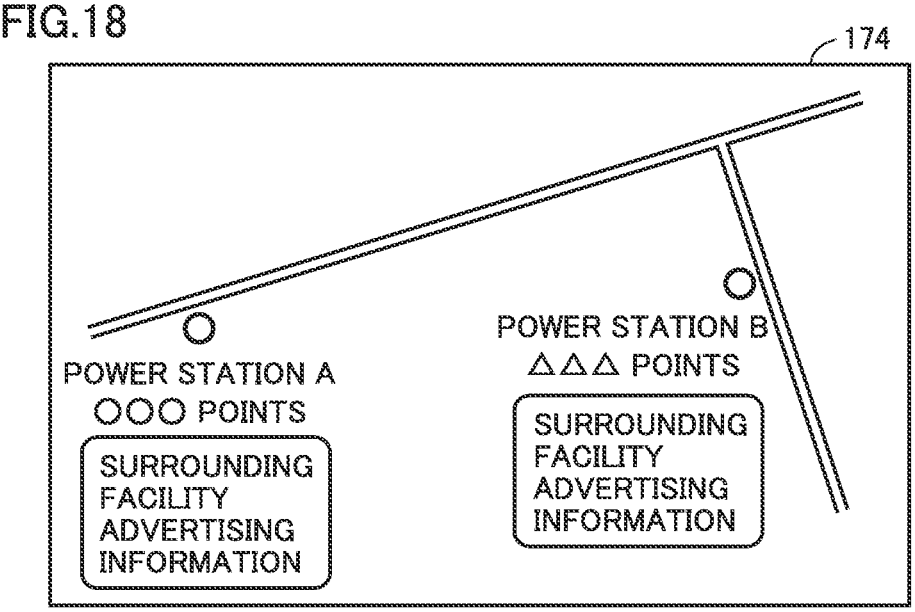
FIG. 18 is a diagram (No. 3) showing an exemplary screen displayed on the display.

FIG. 18 shows an exemplary screen displayed on display 174 according to modification 9. As shown in FIG. 17, the screen of display 174 simultaneously displays, in addition to the location and the value points of power station A and the location and the value points of power station B, advertising information of a surrounding facility of power station A and advertising information of a surrounding facility of power station B on the map screen.

With such display, the user of the vehicle can be encouraged to use both power station 200 and the surrounding facility of power station 200.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power management system comprising:
   a vehicle configured to supply power to a discharging installation and receive power from a charging installation;
   a plurality of power installations each having at least one of the discharging installation and the charging installation installed therein; and
   a server configured to communicate with the vehicle and the plurality of power installations, wherein
   when each of the power installations receives power from the vehicle or supplies power to the vehicle, each of the power installations is configured to associate a power amount received from the vehicle or a power amount supplied to the vehicle with identification information of a user of the vehicle, and transmit the power amount to the server, and
   the server is configured to set a value index based on the power amount received from the power installation, and provide the value index to the user having the identification information associated with the power amount.

2. The power management system according to claim 1, wherein
   when a user who performed power supply to a first power installation performs power reception from a second power installation at a location different from that of the first power installation, the server is configured to decrease the value index provided to the user.

3. The power management system according to claim 1, wherein
   the server is configured to separately set, for each of the plurality of power installations, a value of the value index provided for using the power installation.

4. The power management system according to claim 1, wherein
   the vehicle includes a power storage device detachable from the vehicle, and
   the power installation is configured to
      receive power from the vehicle by device collection where the power storage device is collected from the vehicle, and
      supply power to the vehicle by device replacement where the power storage device collected from the vehicle is replaced with a charged power storage device, or by device supply where the charged power storage device is supplied to the vehicle.

5. The power management system according to claim 4, wherein
   the server is configured to set the value index to a higher value when a state of charge of the power storage device collected at the power installation by the device collection or the device replacement is lower.

6. The power management system according to claim 4, wherein the server is configured to separately set, for each of the plurality of power installations, the value index for the device collection, the value index for the device replacement, and the value index for the device supply.

7. The power management system according to claim 4, wherein
the server is configured to set the value index for the device collection, the value index for the device replacement, and the value index for the device supply, depending on a power supply-demand situation at a location where each of the power installations is installed.

8. The power management system according to claim 4, wherein
the server is configured to set the value index for the device collection, the value index for the device replacement, and the value index for the device supply, depending on a number of the power storage devices that have been collected at each of the power installations.

9. The power management system according to claim 1, wherein
the server is configured to associate the value index provided for using each of the power installations with location information of each of the power installations, and transmit the value index to the vehicle, and
the vehicle includes a navigation device to set any one of the locations of the power installations received from the server as a destination of the vehicle.

10. The power management system according to claim 1, wherein
the server is configured to transmit the value index provided for using each of the power installations to the vehicle, and
the vehicle includes a display configured to simultaneously display a power amount supplied to or received from the power installation, and the value index provided for using the power installation.

11. The power management system according to claim 1, wherein
the server is configured to associate the value index provided for using each of the power installations with location information of each of the power installations, and transmit the value index to the vehicle, and
the vehicle includes a display configured to simultaneously display the location of the power installation, and a value of the value index provided for using the power installation on a map screen.

12. The power management system according to claim 11, wherein
the server is configured to transmit advertising information of a surrounding facility of each of the power installations to the vehicle, and the display is configured to simultaneously display, in addition to the location of the power installation and the value of the value index, the advertising information of the surrounding facility of the power installation on the map screen.

13. A server configured to communicate with a vehicle and a plurality of power installations,
the vehicle being configured to supply power to a discharging installation and receive power from a charging installation,
each of the power installations including at least one of the discharging installation and the charging installation, and when receiving power from the vehicle or supplying power to the vehicle, each of the power installations being configured to associate a power amount received from the vehicle or a power amount supplied to the vehicle with identification information of a user of the vehicle, and transmit the power amount to the server,
the server comprising:
a communication device configured to communicate with the plurality of power installations; and
a controller connected to the communication device, wherein
the controller is configured to set a value index based on the power amount received from the power installation, and provide the value index to the user having the identification information associated with the power amount.

14. A vehicle configured to supply power to a discharging installation and receive power from a charging installation, the vehicle comprising:
a communication device configured to communicate with a server and a plurality of power installations;
a display; and
a controller configured to control the display, wherein
each of the power installations includes at least one of the discharging installation and the charging installation, and when receiving power from the vehicle or supplying power to the vehicle, each of the power installations is configured to associate a power amount received from the vehicle or a power amount supplied to the vehicle with identification information of a user of the vehicle, and transmit the power amount to the server,
the server is configured to convert the power amount received from the power installation into a value index, and provide the value index to the user having the identification information associated with the power amount, and
the controller is configured to cause the display to simultaneously display a power amount supplied to or received from the power installation, and the value index provided for using the power installation.

* * * * *